United States Patent [19]

Yoshino et al.

[11] Patent Number: 4,497,459
[45] Date of Patent: Feb. 5, 1985

[54] TAPE DRIVE CONTROL APPARATUS

[75] Inventors: Tadashi Yoshino; Masayuki Mamei, both of Osaka, Japan

[73] Assignee: Matsushita Electric Industrial Co., Ltd., Osaka, Japan

[21] Appl. No.: 562,861

[22] Filed: Dec. 19, 1983

[30] Foreign Application Priority Data

Dec. 20, 1982 [JP] Japan ................................ 57-224236

[51] Int. Cl.³ ........................ G03B 1/04; G11B 15/32
[52] U.S. Cl. ................................ 242/186; 242/203; 318/7; 360/71
[58] Field of Search .............. 242/186, 191, 200–204; 318/6, 7; 360/71, 73, 74.1, 74.2, 74.3

[56] References Cited

U.S. PATENT DOCUMENTS

| | | | |
|---|---|---|---|
| 3,982,160 | 9/1976 | Goldschmidt et al. | 318/7 |
| 4,156,257 | 5/1979 | Roberts | 360/71 |
| 4,338,640 | 7/1982 | Yabu et al. | 360/73 |
| 4,341,363 | 7/1982 | Inatome | 242/189 |
| 4,448,368 | 5/1984 | Skalko | 242/186 |

Primary Examiner—Leonard D. Christian
Attorney, Agent, or Firm—Burgess, Ryan & Wayne

[57] ABSTRACT

A tape drive control apparatus controls to set a tape speed to be constant in a fast forward or rewind mode (wherein a magnetic tape is driven by only reel motors without using a capstan) by using an output from rotation detectors for respectively detecting rotational frequencies of the supply and take-up reels, and to set a tape tension to be constant in a constant-speed mode (wherein the magnetic tape is driven by the capstan) by utilizing part of a tape velocity control system irrespective of the rotational frequency of the capstan.

3 Claims, 8 Drawing Figures

TAPE DRIVE CONTROL APPARATUS

BACKGROUND OF THE INVENTION

I. Field of the Invention

The present invention relates to a tape drive control apparatus for a magnetic recording/reproducing apparatus using a magnetic tape as a recording medium.

II. Description of the Prior Art

FIG. 1 shows the overall arrangement of a tape drive system of a cassette video tape recorder (to be referred to as a VTR hereinafter). Referring to FIG. 1, reference numeral 1 denotes a tape cassette; and 2, a magnetic tape. Reference numerals 3 and 4 denote a supply reel shaft and a take-up reel shaft, respectively. The supply reel shaft 3 and the take-up reel shaft 4 can engage with a supply reel 5 and a take-up reel 6 of the tape cassette 1, respectively. Reference numerals 7 and 8 respectively denote a supply reel motor and a take-up reel motor which directly drive the supply and take-up reel shafts 3 and 4, respectively. Reference numeral 9 denotes a rotary head cylinder provided with a pair of rotary video heads. The magnetic tape 2 is wound around the rotary head cylinder 9 for an angular interval corresponding to an angle of about 180°. The rotary head cylinder 9 performs helical scanning such that video signals are recorded to form oblique recording tracks on the magnetic tape 2 along its longitudinal direction, and such that the recorded video signals may be reproduced from the oblique recording tracks. A capstan 10 clamps the magnetic tape 2 with a pinch roller 11 so as to drive the magnetic tape 2 at a predetermined speed. Reference numeral 12 denotes a full-width erase head; 13, an audio erase head; and 14, an audio control head. In the fast forward and rewind modes, the capstan 10 is separated from the pinch roller 11, so that the magnetic tape 2 travels along a travel path 15.

FIG. 2 is a block diagram of a conventional tape drive control apparatus for controlling fast forward and constant-speed tape travel. Referring to FIG. 2, when the tape is fast forwarded by the reel motors without using the capstan 10, frequency generators (to be referred to as FGs hereinafter) 21 and 22 detect rotational velocity or rpm data of the supply and take-up reel motors 7 and 8, respectively. Output signals from the FGs 21 and 22 are supplied to f-v (frequency-voltage) converters 23 and 24, respectively. Voltage signals from the f-v converters 23 and 24 are mixed by a mixer 25 at a ratio of 1:1. A composite output from the mixer 25 is supplied to a take-up speed comparator 26 and is compared with a reference voltage generated from a reference voltage generator 27. An output from the take-up speed comparator 26 is supplied to a take-up reel motor driver 29 through a switch (to be referred to as an SW hereinafter) 28, so that the take-up reel motor 8 is controlled to take up the magnetic tape 2 at a substantially constant speed. On the other hand, an output from a supply reel motor torque generator 30 is supplied to a supply reel motor driver 32 through an SW 31 so that a predetermined torque is generated from the supply reel motor 7. As a result, a proper tension occurs in the magnetic tape 2.

When the magnetic tape is driven at a constant speed while it is brought into tight contact with the capstan 10 and the pinch roller 11, an output from a supply reel motor torque generator 33 is supplied to the supply reel motor driver 32 through the SW 31 so that a predetermined torque is generated from the supply reel motor 7 to apply a proper tension to the magnetic tape 2. At the same time, an output from a take-up reel motor torque generator 34 is supplied to the take-up reel motor driver 29 through the SW 28 so that the predetermined torque is generated from the take-up reel motor 8. Then, the magnetic tape 2 fed in tight contact with the capstan 10 and the pinch roller 11 is taken up by the take-up reel 6.

FIG. 3 shows a block diagram of a conventional f-v converter, and FIG. 4 shows a timing chart of signals generated from the main part thereof. Referring to FIG. 3, a reel FG signal $S_1$ is supplied to a pulse generator 42 through an input terminal 41. A sampling pulse signal $S_2$ is generated by the pulse generator 42 in response to every leading edge of the reel FG signal $S_1$. The pulse generator 42 also generates a reset pulse signal $S_3$ which is slightly delayed from the sampling pulse signal $S_2$. The reset pulse signal $S_3$ is supplied to a triangular wave shaper 43. A triangular wave signal $S_4$ from the triangular wave shaper 43 is supplied to a sample/hold circuit 44. The sample/hold circuit 44 also receives the sampling pulse signal $S_2$. The voltage of the triangular wave signal $S_4$ is sampled-held by the sample/hold circuit 44 which then generates a signal $S_5$. The signal $S_5$ appears at an output terminal 45 and is supplied to the mixer 25.

In this conventional example, a constant current $I_S$ flows in the supply reel motor 7 such that a torque is generated from the supply reel motor 7 so as to generate a tape tension (counterclockwise) in a constant-speed mode. A torque $\Phi_S$ generated from the supply reel motor 7 is given as follows:

$$\Phi_S = K_{TS} \cdot I_S \qquad (1)$$

where $K_{TS}$ is the torque generation constant. A tape tension $T_S$ at an exit of the supply reel is given below:

$$T_S = \Phi_S / R_S \qquad (2)$$

where $R_S$ is the radius of the tape coil wound around the supply reel. Since the torque $\Phi_S$ generated from the supply reel motor 7 is kept constant, the tape tension $T_S$ at the exit of the supply reel 5 is increased in inverse proportion to a decrease in the radius $R_S$ of the coil of the magnetic tape wound around the supply reel. When the magnetic tape passes along various posts, the tape tension is increased at a rate $e^{\mu\theta}$ (where $\mu$ is the tape friction coefficient and $\theta$ is the tape winding angle), so that a tape tension $T_{CI}$ at the entrance of the capstan 10 becomes very high. Similarly, a constant current $I_T$ flows in the tape-up reel motor 8, such that a torque $\Phi_T$ generated from the take-up reel motor 8 is given as follows:

$$\Phi_T = K_{TT} \cdot I_T \qquad (3)$$

where $K_{TT}$ is the torque generated from the take-up reel motor 8. A tape tension $T_T$ acting at the entrance of the take-up reel 6 is given below:

$$T_T = \Phi_T / R_T \qquad (4)$$

where $R_T$ is the radius of the coil of the magnetic tape 2 wound around the take-up reel 6. Since the torque $\Phi_T$ generated from the take-up reel motor 8 is constant, the tape tension $T_T$ acting at the entrance of the take-up reel 6 is decreased in inverse proportion to an increase in the radius $R_T$ of the coil of the magnetic tape 2 wound around the take-up reel 6. When the magnetic tape passes along various posts, the tape tension is decreased at a rate of $e^{\mu\theta}$, so that a tape tension $T_{CO}$ at the exit of the capstan is decreased. Therefore, a difference between tensional forces at the entrance and exit of the capstan 10 is given below:

$$\Delta T_C = T_{CI} - T_{CO} \quad (5)$$

thus resulting in a great difference or change.

In this conventional example, the capstan motor for driving the capstan requires a great torque. In addition to this disadvantage, it is undesirable to change the tape tension in a constant-speed mode in accordance with the radius of the magnetic tape 2 wound around the supply and take-up reels 5 and 6. Furthermore, the f-v converter comprises an analog circuit, so that a large number of component parts is required.

SUMMARY OF THE INVENTION

It is an object of the present invention to provide a tape drive control apparatus which stabilizes tape travel and which suitably comprises an integrated circuit.

According to the present invention, there is provided tape supply and take-up period measuring means which serves as an f-v converter for receiving reel rotational data and a reference frequency signal in the fast forward or rewind mode wherein a magnetic tape is driven by only reel motors without using a capstan, and which serves as a tape winding radius detector for receiving reel rotational data and capstan rotational data in a constant-speed mode wherein the magnetic tape is driven by the capstan at the constant speed. An output from the period measuring means is supplied to low-pass filters (LPF), respectively. Outputs from the low-pass filters are used to control the supply and take-up reel motors, respectively. As a result, stable tape travel can be obtained.

Other objects, features and advantages of the present invention will be apparent from the following detailed description in conjunction with the accompanying drawings.

DETAILED DESCRIPTION OF THE PREFERRED EMBODIMENT

Figure 1:
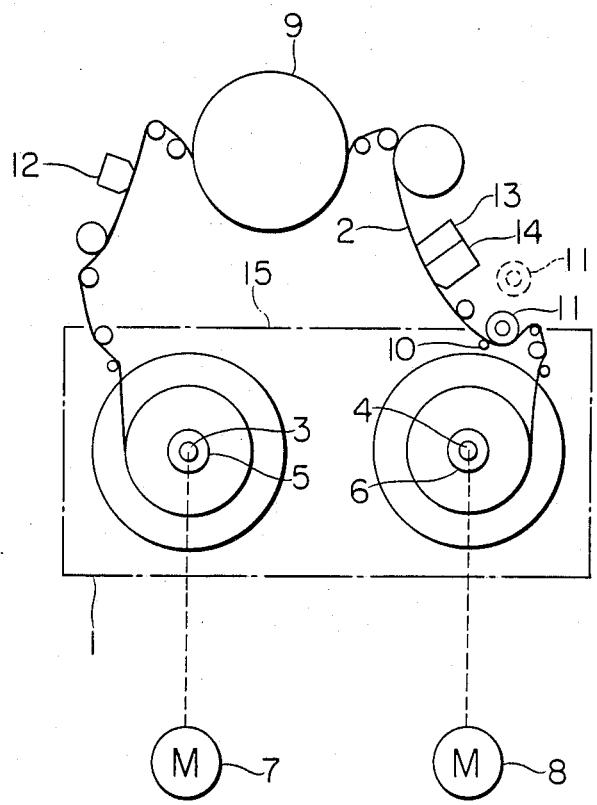
FIG. 1 is a schematic view showing the overall construction of a VTR tape drive system.
Figure 2:
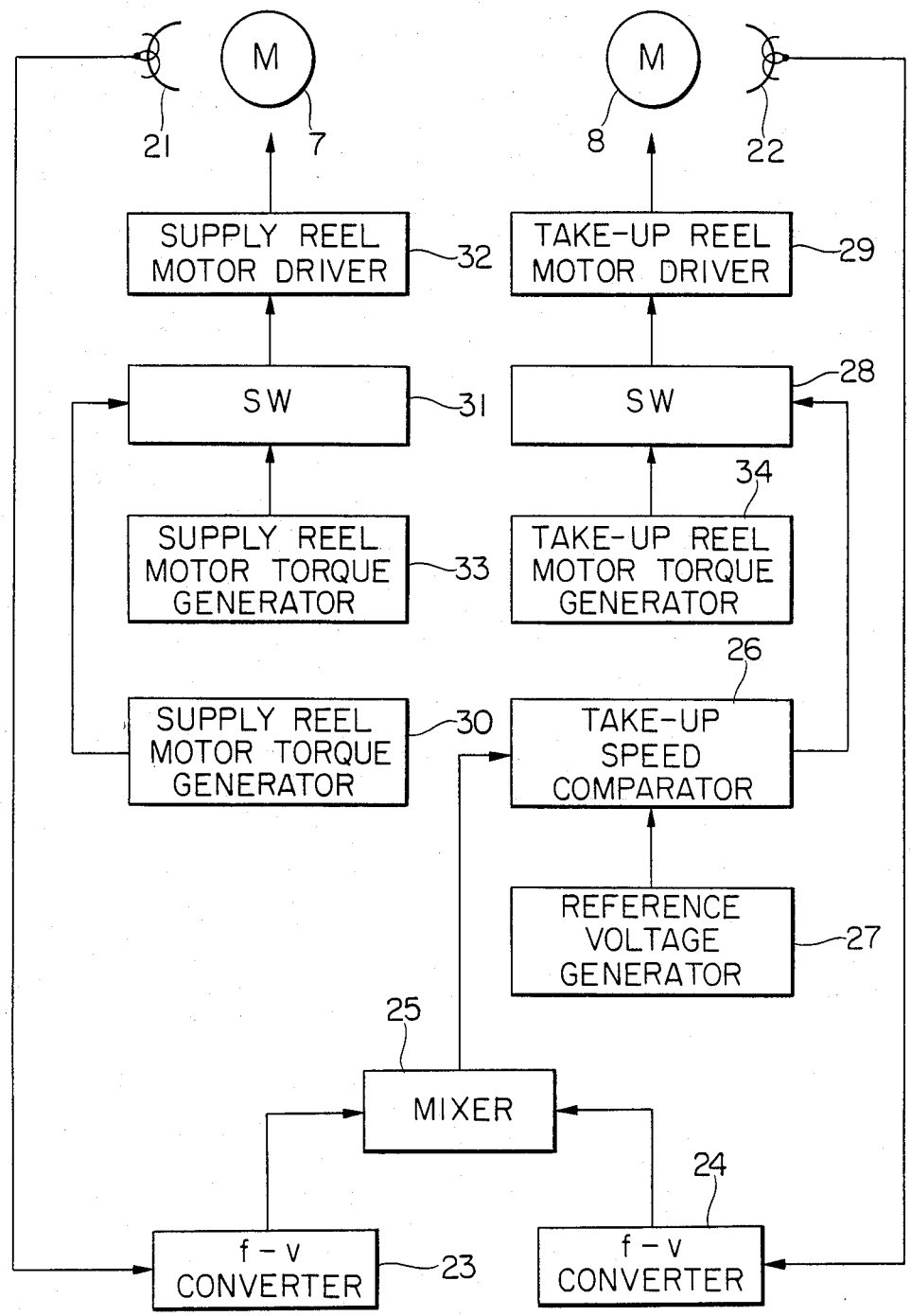
FIG. 2 is a block diagram of a conventional tape drive control apparatus.
Figure 3:
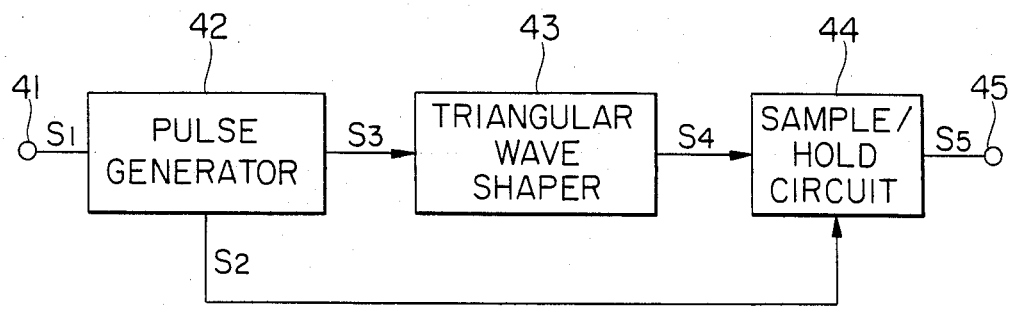
FIG. 3 is a block diagram of an f-v converter of the apparatus shown in FIG. 2.
Figure 4:
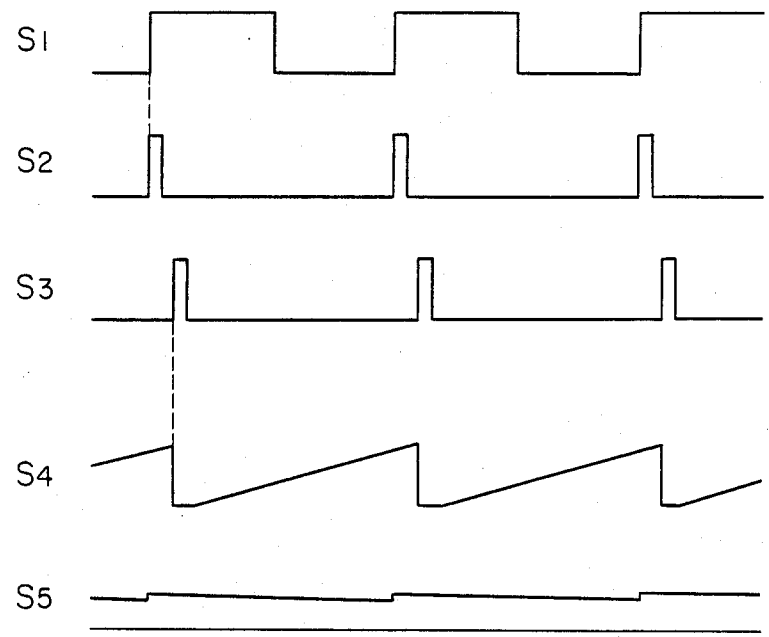
FIG. 4 is a timing chart of signals generated by the main part of the f-v converter shown in FIG. 3.
Figure 5:
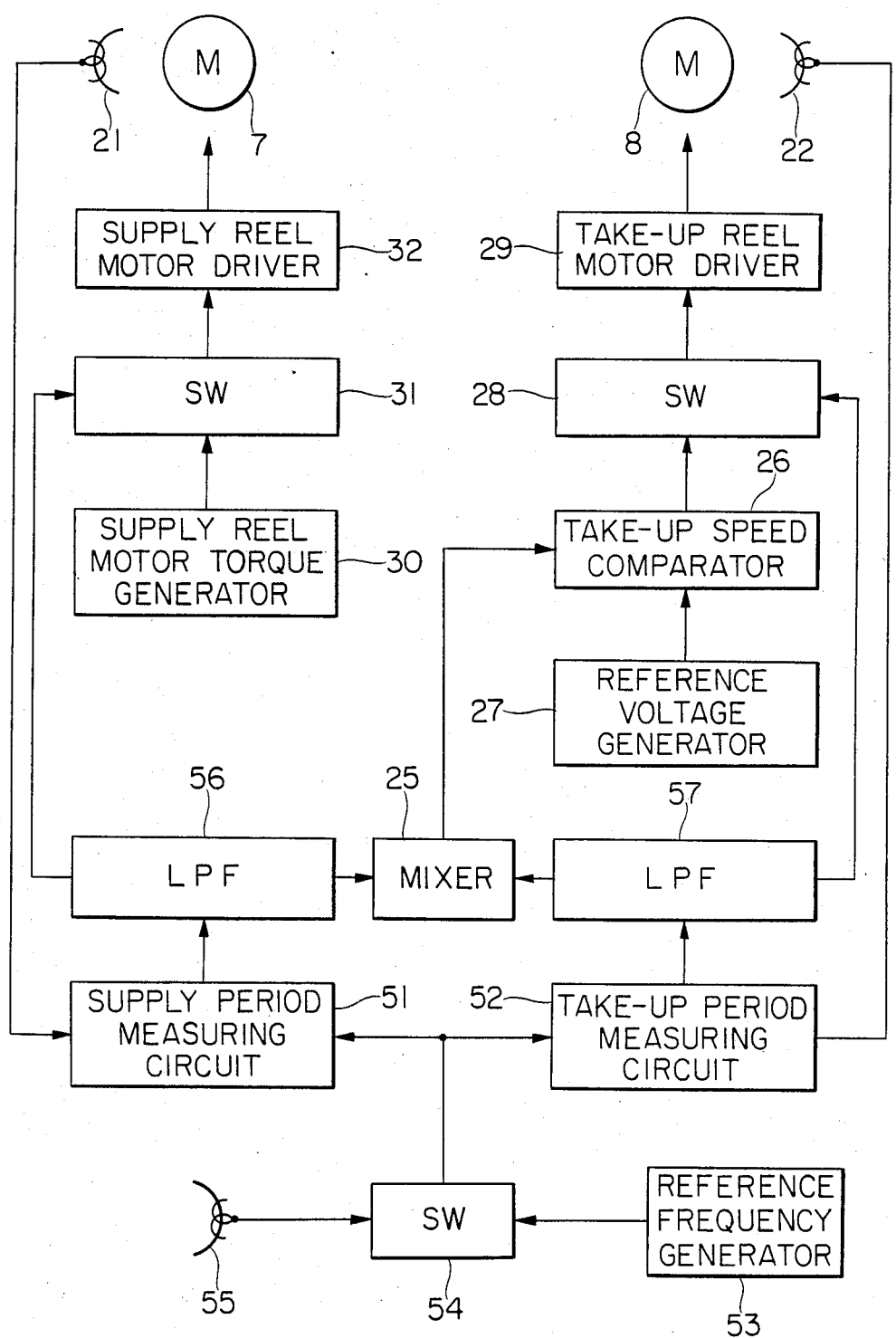
FIG. 5 is a block diagram of a tape drive control apparatus according to an embodiment of the present invention.

FIG. 5 shows a tape drive control apparatus according to an embodiment of the present invention. Referring to FIG. 5, when fast forwarding is performed without using a capstan, rotational velocity data of supply and take-up reel motors 7 and 8 are detected by reel FGs 21 and 22, respectively. Outputs from the reel FGs 21 and 22 are supplied to supply and take-up period measuring circuits 51 and 52, respectively. Meanwhile, a reference frequency signal generated from a reference frequency generator 53 is supplied to the supply and take-up period measuring circuits 51 and 52. The reel FG frequencies are converted to corresponding voltages in accordance with the reference frequency signal. Voltage signals from the period measuring circuits 51 and 52 are supplied to a mixer 25 through low-pass filters (LPF) 56 and 57, respectively, and are mixed at a ratio of 1:1. A composite signal from the mixer 25 is supplied to a take-up speed comparator 26 and is compared with a reference voltage generated from a speed preset reference voltage generator 27. An output from the speed comparator 26 is supplied to a take-up reel motor driver 29 through an SW 28. An output from the driver 29 is supplied to the take-up reel motor 8, so that the take-up reel motor 8 is controlled to take up the magnetic tape at a substantially constant speed. On the other hand, an output from a supply reel motor torque generator 30 is supplied to a supply reel motor driver 32 through an SW 31. The supply reel motor 7 then generates a predetermined torque in response to the output from the driver 32, so that a proper tension acts on the magnetic tape.

When the magnetic tape is driven at a constant speed while the tape is brought into tight contact with the capstan and the pinch roller, rotational velocity data of the supply and take-up reel motors 7 and 8 are detected by the reel FGs 21 and 22, respectively. Outputs from the reel FGs 21 and 22 are supplied to the supply and take-up period measuring circuits 51 and 52, respectively. Meanwhile, rotational velocity data of the capstan is detected by a capstan frequency generator (to be referred to as a capstan FG) 55. An output from the capstan FG 55 is supplied to the supply and take-up period measuring circuits 51 and 52 through an SW 54. An output from the capstan FG 55 serves as a reference signal for detecting the tape coil radius, and signals corresponding to the tape coil radii of the magnetic tape wound around the supply and take-up reels are extracted. An output from the supply period measuring circuit 51 is supplied to the supply reel motor driver 32 through the low-pass filter 56 and the SW 31, so that the supply reel motor 7 generates a torque corresponding to the tape coil radius in accordance with the output from the driver 32. As a result, a predetermined tension acts on the magnetic tape. On the other hand, an output from the take-up period measuring circuit 52 is supplied to the take-up motor driver 29 through the low-pass filter 57 and the SW 28. The take-up reel motor 8 generates the torque corresponding to the tape coil radius of the magnetic tape wound around the take-up reel in accordance with the output generated from the driver 29, so that a predetermined tension acts on the magnetic tape.

Figure 8:
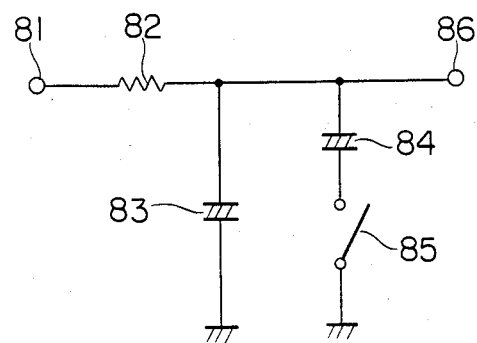
FIG. 8 is a circuit diagram of a low-pass filter shown in FIG. 5.

A detailed arrangement of the low-pass filter 56 or 57 is illustrated in FIG. 8. An output from the period measuring circuit 51 or 52 is supplied to an input terminal 81. The input terminal 81 is connected to an output terminal 86 through a resistor 82. The output terminal 86 is grounded through a capacitor 83, and is also grounded through a capacitor 84 and a switch 85. The switch 85 is opened in the fast forward mode to decrease a time constant of the filter, so that the response characteristics of the control system cover a higher frequency band. However, in a constant-speed mode using the capstan, the switch 85 is closed to increase the time constant of the filter, so that the response characteristics of the control system are limited to a low frequency band.

Figure 6:
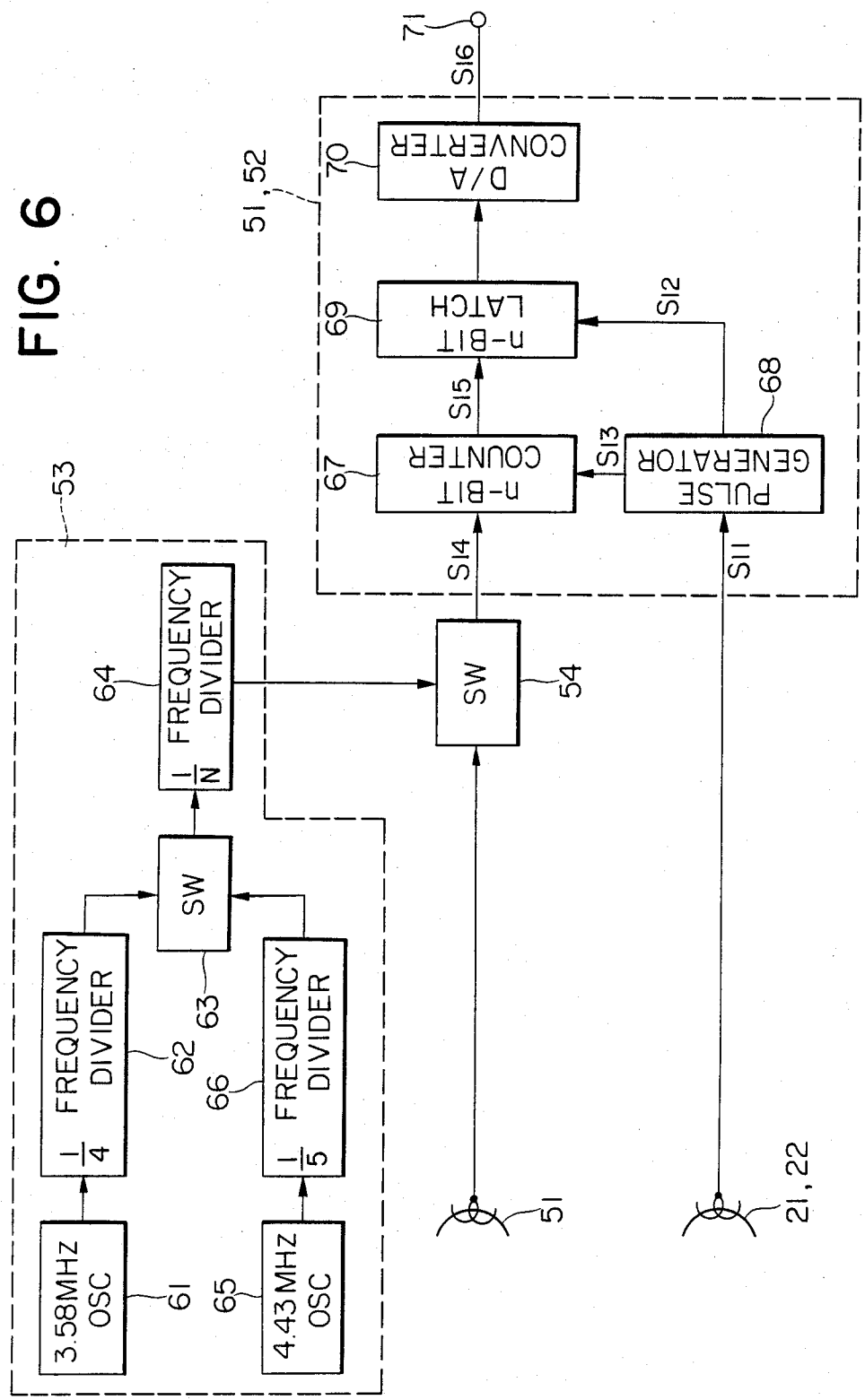
FIG. 6 is a block diagram showing the main part of the apparatus shown in FIG. 5.
Figure 7:
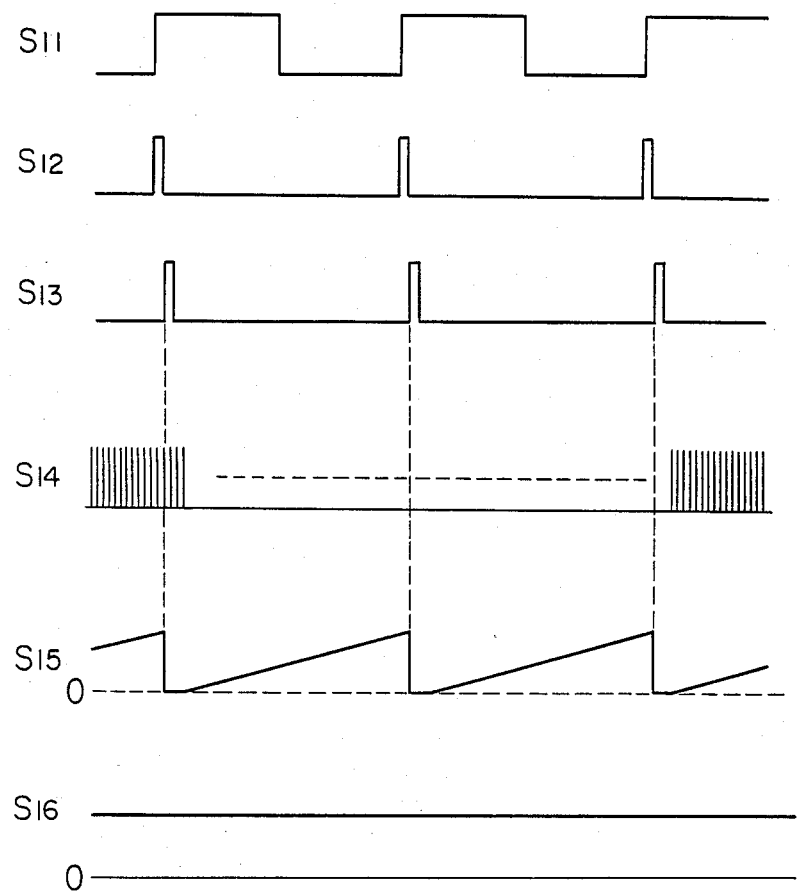
FIG. 7 is a timing chart of signals generated by the main part of the apparatus shown in FIG. 5.

FIG. 6 is a block diagram showing the main part of the tape drive control apparatus of the present invention, and FIG. 7 is a timing chart of the signals generated therefrom. Referring to FIG. 6, when an NTSC color television VTR is used, a 3.58-MHz signal from a 3.58-MHz oscillator 61 is supplied to a 1/N (where N is an integer) frequency divider 64 through a ¼ frequency divider 62 and an SW 63. However, when a PAL color television VTR is used, a 4.43-MHz signal from a 4.43-MHz oscillator 65 is supplied to the 1/N frequency divider 64 through a 1/5 frequency divider 66 and the SW 63. In the fast forward mode, an output signal from the 1/N frequency divider 64 is supplied to an n-bit counter 67 through an SW 54. However, in the constant-speed mode, an output signal from the capstan FG 55 is supplied to the n-bit counter 67 through an SW 54.

Meanwhile, an output signal $S_{11}$ from the reel FG 21 or 22 is supplied to a pulse generator 68. The pulse generator 68 generates a latch pulse signal $S_{12}$ in response to the leading edge of the signal $S_{11}$. The pulse generator 68 also generates a reset pulse signal $S_{13}$ which is slightly delayed from the latch pulse signal $S_{12}$. A signal $S_{14}$ passing through the SW 54 and the reset pulse signal $S_{13}$ are supplied to the clock and reset input terminals, respectively, of the n-bit counter 67. The count of the n-bit counter 67 can be represented by a triangular wave signal $S_{15}$ when expressed in an analog manner. The signals $S_{12}$ and $S_{15}$ are supplied to an n-bit latch 69, so that the content of the n-bit counter 67 is latched by the latch 69 in response to the latch pulse signal $S_{12}$. An output from the n-bit latch 69 is supplied to a digital-to-analog converter (to be referred to as a D/A converter) 70. The D/A converter 70 generates an analog signal as a DC voltage signal $S_{16}$. The DC voltage signal $S_{16}$ appears at an output terminal 71 and is supplied to the low-pass filter 56 or 57.

According to the arrangement as described above, the torques corresponding to the coil radii of the magnetic tape wound around the supply and take-up reels can be generated from the corresponding reel motors in the constant-speed mode using the capstan. This is because a magnetic tape travel speed S (mm/sec) is given as follows:

$$S = 2 \cdot \pi \cdot R_C \cdot N_C = 2 \cdot \pi \cdot R_R \cdot N_R \quad (6)$$

where $R_C$ is the radius (mm) of the capstan, $N_C$ is the rotational frequency (rps) of the capstan, $R_R$ is the radius (mm) of the magnetic tape coil wound around a given reel, and $N_R$ is the rotational frequency (rps) of the given reel. A frequency $f_C$ (Hz) of the signal generated from the capstan FG is given as follows:

$$f_C = Z_C \cdot N_C \quad (7)$$

where $Z_C$ is the number of teeth of the capstan FG. Similarly, a frequency $f_R$ (Hz) of the signal generated from the reel FG is given as follows:

$$f_R = Z_R \cdot N_R \quad (8)$$

where $Z_R$ is the number of teeth of the reel FG. The number of pulses of the signal generated from the capstan FG during one period of the signal from the reel FG is given in the following manner:

$$f_C/f_R = Z_C \cdot N_C / Z_R \cdot N_R \quad (9)$$

therefore, in accordance with equation (6), $$f_C/f_R = (Z_C \cdot R_R)/(Z_R \cdot R_C) \quad (10)$$

The radius $R_R$ of the magnetic tape coil wound around reel can be calculated by obtaining $f_C/f_R$ at any tape speed.

In still image reproduction, the tape coil radius $R_R$ immediately before a still image is reproduced is latched in the n-bit latch 69. This latched data can be stored in a memory for still image reproduction. Furthermore, at the beginning of tape travel, proper operation cannot be performed unless two pulses are supplied from a given reel FG to the corresponding period measuring circuit, so that an initial value which is an average value between a maximum coil radius and a minimum coil radius is supplied to the n-bit latch 69. On the other hand, when the tape travel direction is reversed, the tape coil radius in the immediately previous state is stored, and detection is started after reversal of driving direction of the magnetic tape is completed. Furthermore, since a voltage proportional to the reel FG signal can be detected by counting the number of clock pulses (output pulses generated from the 1/N frequency divider) present during one period of the signal from the reel FG in the fast forward mode, a voltage in inverse proportion to the reel FG frequency is finally obtained. In the NTSC color television VTR, the signal from the 3.56-MHz oscillator 61 is supplied to the ¼ frequency divider 62 to obtain an 895-kHz signal. However, in the PAL color television VTR, the signal from the 4.43-MHz oscillator 65 is supplied to the 1/5 frequency divider 68 to obtain an 886-kHz signal. Either of the signals is used as a clock signal of the n-bit counter 67 through the 1/N frequency divider 64, thereby converting the reel FG frequency to the voltage. Furthermore, a plurality of fast forward speeds can be obtained by changing the values (N) of the 1/N frequency divider 64.

As described above according to the present invention, in constant-speed tape travel, the radius of the magnetic tape coil wound around a given reel can be detected at any tape speed without modifying the circuit arrangement. The torques can be generated from the corresponding reel motors in accordance with the detected values. As a result, a constant tape tension can always act on the magnetic tape. Similarly, in the fast forward or rewind mode without using the capstan, the frequency division ratio of the clock signals can change to provide a plurality of tape speeds and to easily detect the position of the magnetic tape. In addition to these advantages, the 3.56-MHz signal (chrominance subcarrier) of the NTSC color signal circuit is divided by the ¼ frequency divider, and the 4.43-MHz signal (chrominance subcarrier) of the PAL color signal circuit is divided by the 1/5 frequency divider, so that the output signal from either circuit can be used as a clock pulse signal to convert the reel FG frequency to a voltage without modifying the circuit arrangement. Furthermore, the n-bit counter is switched such that it receives the clock signal from the 1/N frequency divider output in the fast forward mode and the capstan FG signal in the constant-speed mode, thereby readily providing a tape drive control apparatus suitable for constituting an IC.

What is claimed is:

1. A tape drive control apparatus comprising: supply and take-up reels which are driven by supply and take-up reel motors, respectively; first and second rotation detecting means detecting rotation of said supply and take-up reels and for generating signals having frequencies corresponding to rotational velocities, respectively; tape driving means for driving a magnetic tape while the magnetic tape is brought into tight contact with a capstan and a pinch roller; third rotation detecting means for detecting rotation of said capstan and generating a signal having a frequency corresponding to a rotational velocity of said capstan; first period measuring means, having a first input terminal for receiving an output generated from said first rotation detecting means and a second input terminal for receiving a clock signal, and for generating an output substantially corresponding to the number of clock signals received during one period of the output generated from said first rotation detecting means; second period measuring means, having a first input terminal for receiving an output generated from said second rotation detecting means and a second input terminal for receiving the clock signal, and for generating an output corresponding to the number of clock signals received during one period of the output generated from said second rotation detecting means; first and second low-pass filters for receiving the outputs generated from said first and second period measuring means; mixing means for mixing outputs from said first and second low-pass filters; velocity comparing means for comparing an output from said mixing means with a reference voltage and generating an output corresponding to a difference therebetween; torque generating means for generating a constant voltage; reference frequency signal generating means for generating a signal having a predetermined frequency; first switching means for supplying as the clock signal the signal output from said reference frequency signal generating means to said first and second period measuring means in a fast forward mode wherein the magnetic tape is driven by only said supply and take-up reel motors without using said tape driving means with said capstan, and for supplying as the clock signal the signal output from said third rotation detecting means to said first and second period measuring means in a constant-speed mode wherein the magnetic tape is driven by said tape driving means; second switching means for supplying the output from said torque generating means to said supply reel motor in the fast forward mode and the output from said first low-pass filter to said supply reel motor in the constant-speed mode; and third switching means for supplying the output from said velocity comparing means to said take-up reel motor in the fast forward mode and the output from said second low-pass filter to said take-up reel motor in the constant-speed mode.

2. An apparatus according to claim 1, wherein said second low-pass filter has means for switching such that a cut-off frequency in the fast forward mode is higher than that in the constant-speed mode.

3. An apparatus according to claim 1, wherein each of said first and second frequency measuring means comprises: a pulse generator for receiving the output from a corresponding one of said first and second rotation detecting means and generating a latch pulse and a reset pulse; a counter for receiving the reset pulse at a reset input terminal thereof; a latch for receiving an output from said counter and the latch pulse; and a digital-to-analog converter for receiving a digital signal from said latch and converting the digital signal to an analog signal.

* * * * *